(12) United States Patent
Clement et al.

(10) Patent No.: US 12,515,478 B2
(45) Date of Patent: Jan. 6, 2026

(54) OPTIMIZED ARCHITECTURE OF A CIVIL ENGINEERING TIRE

(71) Applicant: COMPAGNIE GENERALE DES ETABLISSEMENTS MICHELIN, Clermont-Ferrand (FR)

(72) Inventors: Emmanuel Clement, Clermont-Ferrand (FR); Thierry Royer, Clermont-Ferrand (FR); Natalia Bellido-Vera, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 42 days.

(21) Appl. No.: 18/719,215

(22) PCT Filed: Dec. 5, 2022

(86) PCT No.: PCT/EP2022/084432
§ 371 (c)(1),
(2) Date: Jun. 12, 2024

(87) PCT Pub. No.: WO2023/110499
PCT Pub. Date: Jun. 22, 2023

(65) Prior Publication Data
US 2025/0050686 A1 Feb. 13, 2025

(30) Foreign Application Priority Data

Dec. 14, 2021 (FR) ........................................ 2113434

(51) Int. Cl.
*B60C 9/18* (2006.01)
*B60C 9/20* (2006.01)

(52) U.S. Cl.
CPC .......... *B60C 9/2006* (2013.01); *B60C 9/1835* (2013.01); *B60C 2009/1842* (2013.01); *B60C 2009/2051* (2013.01)

(58) Field of Classification Search
CPC .................. B60C 9/1835; B60C 9/185; B60C 2009/1842; B60C 2009/1857;
(Continued)

(56) References Cited

U.S. PATENT DOCUMENTS 5,746,853 A * 5/1998 Burlacot ............... B60C 9/2006
152/526
5,843,583 A  12/1998 D'Haene et al.
(Continued)

FOREIGN PATENT DOCUMENTS

EP  3297851  5/2016
EP  3 921 466  12/2021
(Continued)

OTHER PUBLICATIONS

Machine translation: JP-2012153215-A, Isobe Satoru, (Year: 2025).*
(Continued)

*Primary Examiner* — Kendra Ly
(74) *Attorney, Agent, or Firm* — COZEN O'CONNOR

(57) ABSTRACT

A tire (1) for a vehicle of the construction plant type, having a carcass reinforcement (4) and a crown reinforcement (3), with at least five crown layers (311, 312, 321, 322, 331, 332) having metal reinforcers. The protective layer (312) has elastic reinforcers having a tensile modulus at most equal to 110 GPa. The rubbers, referred to as crown decoupling rubbers (6), that are located around the axial ends of the crown layers (311, 312, 321, 322, 331, 332) have an elongation at break at least equal to 500%, and a dynamic loss tanδ at most equal to 0.06. A crown filler rubber (5) between the axial end of the axially widest working layer (321) and
(Continued)

the carcass reinforcement (4) possibly has an elongation at break at least equal to 650% and a dynamic loss tanδ, at 100° C. at 10 Hz, at most equal to 0.07.

9 Claims, 1 Drawing Sheet

(58) Field of Classification Search
CPC .... B60C 2009/1864; B60C 2009/1871; B60C 2009/1878; B60C 2009/1885; B60C 2009/1892
See application file for complete search history.

(56) References Cited

U.S. PATENT DOCUMENTS

| | | | |
|---|---|---|---|
| 5,879,483 A * | 3/1999 | Gerresheim | B60C 9/18 |
| | | | 152/526 |
| 2018/0126785 A1* | 5/2018 | Navarro-Losada | B60C 9/185 |

FOREIGN PATENT DOCUMENTS

| | | | | |
|---|---|---|---|---|
| JP | H11222008 A | * | 8/1999 | ............ B60C 9/20 |
| JP | 2012153215 A | * | 8/2012 | ............ B60C 9/185 |
| WO | WO2005/014925 | | 2/2005 | |
| WO | WO2007/090603 | | 8/2007 | |
| WO | WO 2015/197294 | | 12/2015 | |
| WO | WO 2020/161404 | | 8/2020 | |
| WO | WO 2021/005301 | | 1/2021 | |

OTHER PUBLICATIONS

Machine translation: JP-H11222008-A, Fukumoto Tetsuhiro, (Year: 2025).*

* cited by examiner

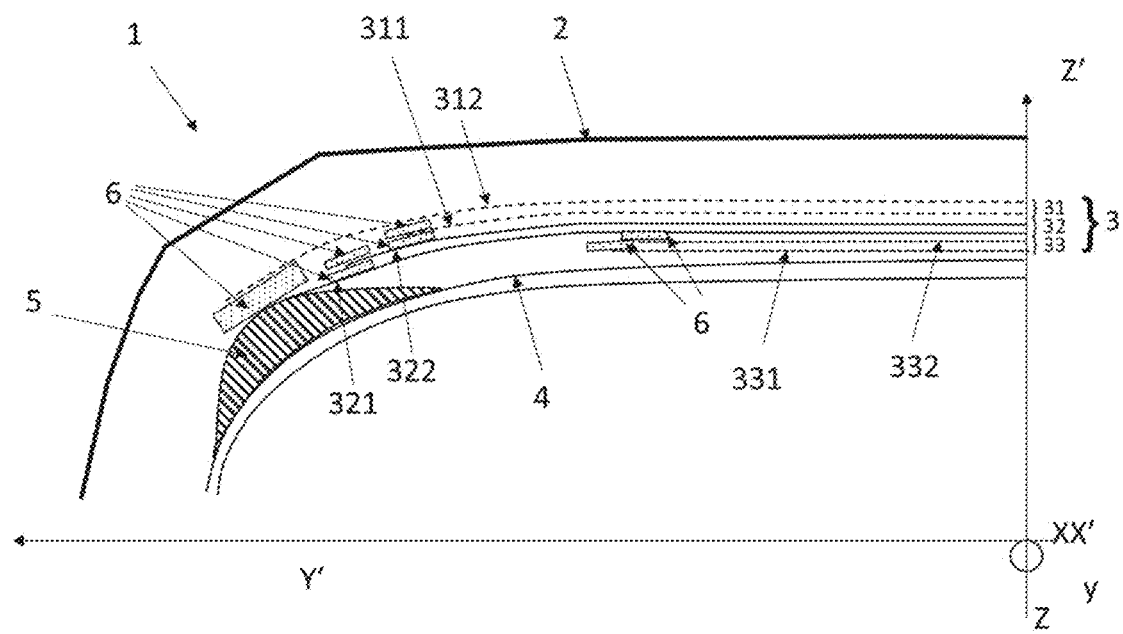

OPTIMIZED ARCHITECTURE OF A CIVIL ENGINEERING TIRE

RELATED APPLICATIONS

This is a U.S. National Phase Application under 35 USC 371 of International Application PCT/EP2022/084432 filed on Dec. 5, 2022.

This application claims the priority of French application no. FR 2113434 filed Dec. 14, 2021, the entire content of all of which is hereby incorporated by reference.

FIELD OF THE INVENTION

The subject of the present invention is a radial tire intended to be fitted to a heavy-duty vehicle of the construction plant type, and the present invention relates more particularly to the crown of such a tire.

BACKGROUND OF THE INVENTION

Radial tires intended to be fitted to a heavy-duty vehicle of the construction plant type are designated as such within the meaning of the European Tire and Rim Technical Organisation, or ERTRO, standard.

For example, a radial tire for a heavy-duty vehicle of the construction plant type, within the meaning of the ETRTO 2020 standard, is intended to be mounted on a rim with a diameter at least equal to 25 inches. The invention is more particularly intended for tires for large dump trucks of the construction plant type and therefore for tires with a diameter at least equal to 57 inches.

Since a tire has a geometry exhibiting symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential direction is tangential to the circumference.

In the following text, the expressions "radially inner/radially on the inside" and "radially outer/radially on the outside" mean "closer to" and "further away from" the axis of rotation of the tire, respectively. "Axially inner/axially on the inside" and "axially outer/axially on the outside" mean "closer to" and "further away from" the equatorial plane of the tire, respectively, with the equatorial plane of the tire being the plane that passes through the middle of the tread surface and is perpendicular to the axis of rotation.

Generally, a tire comprises a tread intended to come into contact with the ground via a tread surface, the two axial ends of which are connected via two sidewalls to two beads that provide the mechanical connection between the tire and the rim on which it is intended to be mounted.

A radial tire also comprises a reinforcement made up of a crown reinforcement radially on the inside of the tread and a carcass reinforcement radially on the inside of the crown reinforcement.

The carcass reinforcement of a radial tire for a heavy-duty vehicle of the construction plant type usually comprises at least one carcass layer comprising generally metal reinforcers that are coated in a polymeric material of the elastomer or elastomeric type that is obtained by blending and is referred to as skim compound or skim rubber. A carcass layer comprises a main part that joins the two beads together and is generally wrapped, in each bead, from the inside of the tire to the outside, around a usually metal circumferential reinforcing element known as a bead wire so as to form a turn-up. The metal reinforcers of a carcass layer are substantially mutually parallel and form an angle of between 80° and 90° with the circumferential direction.

The crown reinforcement of a radial tire for a vehicle of the construction plant type comprises a superposition of circumferentially extending crown layers radially on the outside of the carcass reinforcement. Each crown layer is made up of generally metal reinforcers that are mutually parallel and coated in a polymeric material of the elastomer or coating compound (or rubber) type.

Among the crown layers, a distinction is usually made between the protective layers, which make up the protective reinforcement and are radially outermost, and the working layers, which make up the working reinforcement and are radially comprised between the protective reinforcement and the carcass reinforcement.

The protective reinforcement, which comprises at least one protective layer, essentially protects the working layers from mechanical or physicochemical attacks, which are likely to spread through the tread radially towards the inside of the tire.

The protective reinforcement often comprises two radially superposed protective layers formed of elastic metal reinforcers that are mutually parallel in each layer and crossed from one layer to the next, forming angles at least equal to 10° with the circumferential direction.

The function of the working reinforcement, often comprising at least two working layers, is to belt the tire and confer stiffness and road holding on the tire. It absorbs both mechanical inflation stresses, which are generated by the tire inflation pressure and transmitted by the carcass reinforcement, and mechanical stresses caused by running, which are generated as the tire runs over the ground and are transmitted by the tread. A recurring problem in the crowns of tires is the cracking caused by shear, linked to the running of the tire, of the rubber compounds, coating compounds of the crown layers or other compounds, at the end of the crown layers. These cracks adversely affect the endurance of the tire and decrease its service life. A conventional solution for avoiding this cracking is to decouple the crown layers, notably the working layers, at their axial ends, as shown in FIGS. 1 to 3 of document EP3297851. The crown reinforcement must also withstand impacts and puncturing, by virtue of its intrinsic design, notably its flexibility and, in particular, that of the protective reinforcement. Furthermore, the tire must have an edgewise bending stiffness, or cornering stiffness under transverse load, so as to ensure the vehicle handles correctly on a winding road. Document WO 2021/005301A1 gives examples for compositions of the crown filler compounds.

The working reinforcement usually comprises two radially superposed working layers formed of inextensible metal reinforcers that are mutually parallel in each layer and are crossed from one layer to the next, forming angles at most equal to 50°, and preferably at least equal to 15° and at most equal to 45°, with the circumferential direction. The bilayer, made up of these two working layers, generally ensures sufficient edgewise bending stiffness for the vehicle to handle acceptably.

The crown reinforcement sometimes comprises a triangulation layer radially on the inside of the working layers formed of inextensible metal reinforcers that are mutually parallel and form angles at least equal to 50° with the circumferential direction. The function of this triangulation layer is to avoid the metal reinforcers of the carcass layer being subjected to compression when the tire is running.

In order to reduce the mechanical inflation stresses that are transmitted to the working reinforcement, it is known practice to dispose a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement may be positioned radially on the inside of the working reinforcement, between the two working layers of the working reinforcement, or radially on the outside of the working reinforcement.

In applications of the construction plant type, the hoop reinforcement can comprise two radially superimposed hooping layers formed of metal reinforcers that are mutually parallel in each layer and are crossed from one layer to the next, forming angles at most equal to 10° with the circumferential direction. Another embodiment of the hoop reinforcement consists in circumferentially winding a hooping wire or a continuous hooping strip, forming angles at most equal to 5° with the circumferential direction.

With respect to the metal reinforcers, a metal reinforcer is mechanically characterized by a curve representing the tensile force (in N) applied to the metal reinforcer as a function of its relative elongation (in %), referred to as the force-elongation curve. Mechanical tensile characteristics of the metal reinforcer, such as the structural elongation As (in %), the total elongation at break At (in %), the force at break Fm (maximum load in N) and the breaking strength Rm (in MPa), are derived from this force-elongation curve, these characteristics being measured in accordance with the standard ASTM D 2969-04 of 2014.

The total elongation At of the metal reinforcer is, by definition, the sum of its elastic and plastic structural elongations (At=As+Ae+Ap) and particularly at break where each of the elongations is non-zero. The structural elongation As results from the relative positioning of the metal threads making up the metal reinforcer under a low tensile force. The elastic elongation Ae results, among other things, from the actual elasticity of the metal of the metal threads making up the metal reinforcer, taken individually, the behaviour of the metal following Hooke's law. The plastic elongation Ap results from the plasticity, i.e. the irreversible deformation beyond the yield point, of the metal of these metal threads taken individually. These various elongations and the respective meanings thereof, which are well known to a person skilled in the art, are described, for example, in the documents U.S. Pat. No. 5,843,583, WO2005/014925 and WO2007/090603.

Also defined, at each point on the force-elongation curve of a metal reinforcer, is a tensile modulus expressed in GPa, which represents the gradient of the straight line tangential to the force-elongation curve at this point. In particular, the tensile modulus of the elastic linear part of the force-elongation curve is referred to as the tensile elastic modulus or Young's modulus.

Among the metal reinforcers, a distinction is usually made between the elastic metal reinforcers like those presented in WO 2020/161404A1, such as the ones used in the protective layers, and the inelastic or inextensible metal reinforcers, such as the ones used in the working layers.

An elastic metal reinforcer, in its non-rubberized state, is characterized by a structural elongation As at least equal to 0.5% and a total elongation at break At at least equal to 3%. Moreover, a rubberized elastic metal reinforcer has a tensile elastic modulus at most equal to 150 GPa, and usually between 40 GPa and 120 GPa.

An inextensible metal reinforcer is characterized by a total elongation At, under a tensile force equal to 10% of the force at break Fm, at most equal to 0.2%. Moreover, an inextensible metal reinforcer has a tensile elastic modulus usually between 150 GPa and 200 GPa.

Innovation in transport in the mining sector has led dump-truck manufacturers to develop autonomous-driverless-vehicles. Specifically, the tracks on which these vehicles run are private and are specific to them. Using GPS to guide them is relatively simple and it is not necessary to provide them with complex devices for identifying "pedestrians" and with decision making algorithms. However, this automation has a considerable adverse effect on the tires. It has been found that the endurance of the tires deteriorates if automatic vehicles are used. The appearance of breaks in the rubbers of the crown has visibly increased with the evolution of the driving modes.

SUMMARY OF THE INVENTION

The inventors set themselves the objective of improving the endurance of the crown, notably the cracking of the compounds (or rubber) at the ends of the crown layers, for a radial tire for a vehicle of the construction plant type.

This objective has been achieved, according to the invention, by a tire for a vehicle of the construction plant type, comprising:

- a crown reinforcement, radially on the inside of a tread and radially on the outside of a carcass reinforcement, comprising metal reinforcing elements coated with elastomeric materials, referred to as skim compounds,
- the crown reinforcement, which is substantially symmetrical on either side of the median circumferential plane which is perpendicular to the axis of rotation of the tire and passes through the middle of the tread, the crown reinforcement comprising at least five crown layers comprising metal reinforcing elements coated with elastomeric materials referred to as skim compounds,
- the radially outermost crown layer being a protective layer of which the metal reinforcing elements are elastic, having a tensile modulus at most equal to 110 GPa,
- the crown reinforcement comprising at least one working layer of which the reinforcing elements form an angle at least equal to 15° with the median circumferential plane,
- on either side of the equatorial plane, a filler rubber, referred to as crown filler rubber, comprised between the axial end of the axially widest working layer and the carcass reinforcement, composed of at least one elastomeric material,
- on either side of the equatorial plane, rubbers referred to as crown-decoupling rubbers located between the axial ends of the crown layers and the crown layer closest to said end, the decoupling rubbers having a radial thickness at least equal to 0.5 mm,
- the elongation at break at 100° C. in accordance with the standard NF T 46-002 of the crown-decoupling rubbers being at least equal to 500%, and the maximum dynamic loss tanδ of said crown-decoupling rubbers, measured in accordance with the same standard ASTM D 5992-96, at a temperature of 100° C. and at 10 Hz, being at most equal to 0.06.

The inventors were surprised to find, in particular using test campaigns, that the endurance is improved significantly by improving not the stiffness of the crown rubbers but their elongation at break, although this area of the crown operates at a set energy level. For the endurance of the crown, it is important to have certain minimum values for the elongations at break of the elastomeric materials of the crown, these minimum values being different according to the position of said rubbers, depending on whether these elongations concern the crown filler rubber or the crown-decoupling rubbers positioned between the ends of the crown layers and the closest crown layer. Applying these different requirements regarding the elongations at break to one or the other of these rubbers makes it possible to increase the crown endurance, since the failure of the crown often occurs for the cases which interest the invention, which involve the joining of cracks from the ends of the crown layers through the crown filler layer. Avoiding, slowing down and preventing the spreading of these cracks in the crown filler layer significantly improves the endurance. It is also important, by increasing the values for the elongation at break, to not increase the temperature in the crown; it is therefore also necessary for the dynamic loss of one or the other of these rubbers to comply with the values given by the invention.

Applying all these different requirements to the two types of rubbers of the crown, the crown filler rubber and the crown-decoupling rubbers, gives the best result for the invention. Therefore, it is particularly advantageous if the elongation at break at 100° C. in accordance with the standard NF T 46-002-98 of the at least one elastomeric material from which the crown filler rubber is made is at least equal to 650% and the maximum dynamic loss tanδ of said rubber, measured in accordance with the standard ASTM D 5992-96, at a temperature of 100° C. at 10 Hz, is at most equal to 0.07 and the elongation at break in accordance with the standard NF T 46-002-98 of the crown-decoupling rubbers is at least equal to 500%, and the maximum dynamic loss tanδ of said crown-decoupling rubbers, measured in accordance with the same standard ASTM D 5992-96, at a temperature of 100° C. and at 10 Hz, is at most equal to 0.06.

The measurements for the elongation at break (or breakage) are performed at 100° C. and in accordance with the French standard NF T 46-002 of September 1988. The breaking test specimens are of the H2 type as described in the standard NF ISO 37 of 1 Mar. 2012, apart from the size of the test specimen taken from the tire, which is a test specimen 40mm long, 20 mm wide and 0.3 mm thick. The force to be exerted in order to obtain breaking (stress at break, in MPa (in N/mm)) is determined and the elongation at break (in %) is measured.

To improve the cracking resistance of the crown rubbers, it is particularly advantageous if the decoupling rubbers of the crown layers comprise silica as main reinforcing filler at an overall content of at least 40 parts of filler to 100 parts of elastomer. Main reinforcing filler is understood to mean that the silica represents at least 50% of the mass of the reinforcing fillers present in the compound or rubber in question. This minimum value moreover makes it possible to reach the given values in terms of elongation at break and hysteresis value that are necessary to implement the invention for the crown-decoupling rubbers.

Similarly, it is particularly advantageous if the crown filler rubber of the crown layers comprises silica as main reinforcing filler with at least 30 parts of filler to 100 parts of elastomer. This minimum value moreover makes it possible to reach the given values in terms of elongation at break and hysteresis value that are necessary to implement the invention for the crown filler rubber.

To protect all of the crown layers (working layers, hooping layer, triangulation layer) from the phenomenon of hammering caused by running on stony ground, it is advantageous if a protective layer has the greatest axial width of all the crown layers. The phenomenon of hammering seems to be increased by autonomous vehicles which are not steered optimally to avoid obstacles and preserve the endurance of the tires.

Moreover, to protect the crown from cracking at the end of the crown layers and particularly of the working layers, tire designers usually increase the radial thickness of the rubber compounds at the ends of the working layers. When the tire is running, the crown works at a set energy level. Increasing the radial thickness of rubber compound at this location makes it possible to absorb said shear over a greater thickness and thus decrease the maximum value of the shear. This solution has the disadvantage of increasing the crown thickness and thus the temperature in the crown, and it is important to control this to achieve the objective of the invention.

It is particularly advantageous if the reinforcing elements of at least one protective layer have a diameter at least equal to 2.5 mm and the skim compound of said crown layer comprises natural rubber. This diameter makes it possible to have cords like the 44.35 type (44 threads with a diameter of 35 hundredths of a millimetre) or the 52.26 type (52 threads with a diameter of 26 hundredths of a millimetre), these being very elastic cords that are particularly suitable for withstanding hammering and protecting the crown that they cover from hammering. However, these cords, which have a structural elongation greater than 1% and an elastic modulus less than or equal to 80 GPa and sometimes less than 60 GPa, are very elastic. These characteristics result in a modification of the mode of operation of the skim compounds of the radially outermost crown layer. To have a material particularly suitable for this use, it is necessary for the skim compound of the protective layer comprising this type of cord to comprise natural rubber. The presence of natural rubber can be easily detected by measurements taken using nuclear magnetic resonance. It improves the resistance to wear of the skim rubbers, which is a phenomenon present at the ends. These solutions in which the reinforcing elements of at least one protective layer have a diameter at least equal to 2.5 mm and the skim compound of said protective layer comprises natural rubber are particularly suitable when said protective layer has the greatest width, referred to as projecting. With equally flexible protective layers, it is particularly suitable if the crown-decoupling layers or the crown filler rubbers have an elongation at break in accordance with the invention.

Similarly, for optimum operation, it is particularly advantageous if the elastic modulus G' at 35% strain, at 100° C. and at 10 Hz, of the crown filler rubber, measured in accordance with the standard ASTM D 5992-96, is at most equal to 1.2 MPa.

For further optimization, it is also advantageous if the elastic modulus G' at 35% strain, at 100° C. and at 10 Hz, of the decoupling rubbers, measured in accordance with the standard ASTM D 5992-96, is at most equal to 2.2 MPa.

It is also advantageous if the decoupling rubbers have a radial thickness at least equal to 1.5 mm.

The endurance of the crown can be improved if the crown reinforcement comprises at least one hooping layer comprising metal reinforcers forming an angle ATE with an absolute value at most equal to 10° with the circumferential direction tangential to the circumference of the tire, and of which the axial width is at most equal to 0.7 times the axial width of the axially narrowest working layer. The presence of such a hooping layer makes it possible to limit the rise upon inflation and increases the efficiency of the other characteristics of the invention.

The properties of the compositions (types of rubber, compounds) of rubbers are measured on bonded test specimens taken from the tire. Test specimens such as those described in standard ASTM D 5992-96 (version published in September 2006, initially approved in 1996) in Figure X2.1 (circular version) are used. The diameter "d" of the test specimen is 10 mm [0 to +0.04 mm], the thickness "L" of each of the portions of rubber composition is 2 mm [1.85-2.20] if possible. A person skilled in the art will know how to select and adapt the dimensions of the test specimen according to the quantity of compound accessible and available in particular in the case where test specimens are taken from a finished product such as the tire. These properties are measured on a Metravib VA4000 viscosity analyser. The terms complex modulus, elastic modulus and viscous modulus denote dynamic properties well known to those skilled in the art. The "complex modulus" $G^*$ is defined by the following relationship: $G^*=\sqrt{(G'^2+G''^2)}$ where $G'$ represents the elastic modulus and $G''$ represents the viscous modulus. The phase angle $\delta$ between the force and the displacement, expressed as dynamic loss $\tan\delta$, is equal to the ratio $G''/G'$. The response of a test specimen of vulcanized rubber composition subjected to a simple alternating sinusoidal shear stress at a frequency of 10 Hz with an imposed stress symmetrically about its equilibrium position is recorded. The test specimen is made to undergo accommodation prior to the temperature sweep measurement. For that purpose, the test specimen is subjected to sinusoidal shear stress loading at 10 Hz, at 100% full-scale deformation, at 100° C.

BRIEF DESCRIPTION OF THE DRAWINGS

The features of the invention are illustrated in FIG. 1, which is schematic and not to scale, with reference to a tire of size 59.80R63.

DETAILED DESCRIPTION OF THE DRAWINGS

FIG. 1 shows a meridian cross section through the crown of a tire 1 for a heavy vehicle of the construction plant type, comprising a crown reinforcement 3 radially on the inside of a tread 2 and radially on the outside of a carcass reinforcement 4. The crown reinforcement 3 comprises, radially from the outside to the inside, a protective reinforcement 31, a working reinforcement 32 and a hoop reinforcement 33. The protective reinforcement has two protective layers 311 and 312 comprising elastic metal reinforcers coated with an elastomeric material or coating compound, which are mutually parallel. The working reinforcement 32 comprises two working layers 321, 322, the respective metal reinforcers of which, which are inextensible, are coated with an elastomeric material, are mutually parallel and form angles equal to between 15° and 50° with the circumferential direction XX', are crossed from one working layer to the next. The protective layer 311 projects axially beyond the axially widest working layer, in this case the radially innermost working layer 322. The hoop reinforcement 33 comprises two hooping layers 331, 332, the respective metal reinforcers of which, which are coated in an elastomeric material, are mutually parallel and form an angle of between 5° and 10° with the circumferential direction XX', are crossed from one hooping layer to the next.

A crown filler rubber 5 is disposed between the widest working layer and the carcass reinforcement. Decoupling rubbers 6 are disposed between the ends of the crown layers and the crown layer closest to the end in question.

The invention also works with only 5 crown layers and one protective layer, which would not be projecting. FIG. 1 only shows one of the numerous possible variants of the invention.

FIG. 1 only shows one example, among others, of the possible architectures of the tire of the construction plant type. The invention was tested or evaluated on tires of size 59.80R63. The tires according to the invention were compared with reference tires of the same size for each of the tests, running tests and analysis tests. The tread patterns of the various tires are the same. The reference tires and the tires according to the invention comprise 6 crown layers:

- 2 radially innermost hooping layers, the reinforcing elements of which are made up of 77 threads of 0.35 mm disposed at a pitch of 5.5 mm and forming an angle of +8°/−8° with the circumferential direction at the equatorial plane, the layers crossing one another,
- 2 working layers, the radially innermost one of the 2 working layers having metal reinforcing elements made up of 189 threads of 0.23 mm disposed at a pitch of 5.9 mm and forming an angle of +33° with the circumferential direction at the equatorial plane, the radially outermost working layer having reinforcing elements made up of 77 threads of 0.35 mm disposed at a pitch of 5.5 mm and forming an angle of −24° with the circumferential direction at the equatorial plane,
- 2 radially outer protective layers, the radially innermost one of the 2 protective layers having elastic metal reinforcing elements with a modulus of 50 GPa, made up of 52 threads of 0.26 mm, with a diameter of 3.1 mm, disposed at a pitch of 3.7 mm and forming an angle of +33° with the circumferential direction at the equatorial plane and being the widest layer, the radially outermost protective layer having elastic reinforcing elements with a modulus of 60 GPa, made up of 24 threads of 0.26 mm disposed at a pitch of 2.5 mm and forming an angle of −33° with the circumferential direction at the equatorial plane.

The tires of the invention are identical to the reference tires except that the reference tires have crown filler rubbers of which the elongation at break is equal to 640% and the maximum dynamic loss $\tan\delta$, of said rubber, at a temperature of 100° C. at 10 Hz, is slightly greater than 0.07. The reference tires have crown-decoupling rubbers of which the elongation at break is equal to 470% and of which a maximum dynamic loss $\tan\delta$, at a temperature of 100° C. at 10 Hz, is slightly greater than 0.06.

The compounds of the crown filler rubber of the tires according to the invention have an elongation at break equal to 680% and a maximum dynamic loss $\tan\delta$, of said rubber, at a temperature 100° C. at 10 Hz, is equal to 0.06. The compounds of the decoupling rubbers have an elongation at break equal to 600% and a maximum dynamic loss $\tan\delta$, of said rubber, at a temperature of 100° C. at 10 Hz, equal to 0.055. These properties were obtained by using, for each of the rubbers mentioned, silica as main reinforcing filler at contents of at least 30 parts of filler to 100 parts of elastomer for the crown-decoupling rubbers and 40 parts of filler to 100 parts of elastomer for the crown filler rubbers.

The invention and the reference tires were used on identical vehicles of the construction plant type on one and the same track corresponding to use in the mining sector, known to customers, with identical loading and unloading cycles. At the end of life, the tires were cut and analysed. The tires according to the invention exhibit a crack size at the end of the radially outermost working layer on average 30% smaller than the reference tires. This demonstrates the advantage of the invention as regards the endurance of tires of the construction plant type.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a vehicle of the construction plant type, comprising:

a crown reinforcement, radially on the inside of a tread and radially on the outside of a carcass reinforcement, comprising metal reinforcing elements coated with elastomeric materials, referred to as skim compounds, the crown reinforcement, which is substantially symmetrical on either side of the median circumferential plane which is perpendicular to the axis of rotation of the tyre and passes through the middle of the tread, the crown reinforcement-comprising at least five crown layers comprising metal reinforcing elements coated with elastomeric materials referred to as skim compounds, the radially outermost crown layer being a protective layer of which the metal reinforcing elements are elastic, having a tensile modulus at most equal to 110 GPa, the crown reinforcement comprising at least one working layer of which the reinforcing elements form an angle at least equal to 15° with the median circumferential plane, on either side of the equatorial plane, a filler rubber, referred to as crown filler rubber, comprised between the axial end of the axially widest working layer and the carcass reinforcement, composed of at least one elastomeric material, on either side of the equatorial plane, rubbers referred to as crown-decoupling rubbers located between the axial ends of the crown layers and the crown layer closest to said end, the decoupling rubbers having a radial thickness at least equal to 0.5 mm, wherein the elongation at break at 100° C. in accordance with the standard NF T 46-002 of the crown-decoupling rubbers is at least equal to 500%, and the maximum dynamic loss tanδ of said crown-decoupling rubbers, measured in accordance with the same standard ASTM D 5992-96, at a temperature of 100° C. and at 10 Hz, is at most equal to 0.06.

2. The tire according to claim 1, wherein the elongation at break at 100° C. in accordance with the standard NF T 46-002 of the at least one elastomeric material from which the crown filler rubber is made is at least equal to 650% and the maximum dynamic loss tand of said rubber, measured in accordance with the standard ASTM D 5992-96, at a temperature of 100° C. at 10 Hz, is at most equal to 0.07 and the elongation at break at 100° C. in accordance with the standard NF T 46-002 of the crown-decoupling rubbers is at least equal to 500%, and the maximum dynamic loss tanδ of said crown-decoupling rubbers, measured in accordance with the same standard ASTM D 5992-96, at a temperature of 100° C. and at 10 Hz, is at most equal to 0.06.

3. The tire according to claim 1, wherein the elastomeric materials of the decoupling rubbers (6) comprise silica as main reinforcing filler at a content of at least 40 parts of filler to 100 parts of elastomer.

4. The tire according to claim 1, wherein the elastomeric materials of the crown filler rubber comprise silica as main reinforcing filler at a content of at least 30 parts of filler to 100 parts of elastomer.

5. The tire according claim 1 wherein a protective layer has the greatest axial width of all the crown layers.

6. The fire according to claim 1, wherein the reinforcing elements of at least one protective layer have a diameter at least equal to 2.5 mm, having a tensile modulus at most equal to 80 GPa, and the skim compound of said crown layer comprises natural rubber.

7. The fire according to claim 1, wherein an elastic modulus G' at 35% strain at 100° C. and at 10 Hz of the crown filler rubber (6), measured in accordance with the standard ASTM D 5992-96, is at most equal to 1.2 MPa.

8. The tire according to claim 1, wherein an elastic modulus G' at 35% strain at 100° C. and at 10 Hz of the decoupling rubbers-($), measured in accordance with the standard ASTM D 5992-96, is at most equal to 2.2 MPa.

9. The tire according to claim 1, wherein the decoupling rubbers have a radial thickness at least equal to 1.5 mm.

* * * * *